(12) United States Patent
Meister et al.

(10) Patent No.: US 8,376,458 B2
(45) Date of Patent: Feb. 19, 2013

(54) SEAT PAN CAM FOLLOWER WITH DROP DOWN MECHANISM

(75) Inventors: Peter Meister, Weston, FL (US); Larry Hazbun, Miramar, FL (US)

(73) Assignee: B/E Aerospace, Inc., Wellington, FL (US)

( * ) Notice: Subject to any disclaimer, the term of this patent is extended or adjusted under 35 U.S.C. 154(b) by 304 days.

(21) Appl. No.: 12/610,579

(22) Filed: Nov. 2, 2009

(65) Prior Publication Data

US 2011/0101751 A1 May 5, 2011

(51) Int. Cl.
*B60N 2/02* (2006.01)

(52) U.S. Cl. ......... 297/318; 297/342; 297/320; 297/341

(58) Field of Classification Search .................. 297/317, 297/318, 319, 320, 321, 340, 341, 342
See application file for complete search history.

(56) References Cited

U.S. PATENT DOCUMENTS

| | | | |
|---|---|---|---|
| 3,121,950 A * | 2/1964 | Maier et al. | 228/118 |
| 3,880,462 A * | 4/1975 | Mednick | 297/84 |
| 4,687,250 A | 8/1987 | Esche | |
| 5,823,614 A * | 10/1998 | Johnson et al. | 297/85 C |
| 6,604,791 B1 * | 8/2003 | Chen | 297/330 |
| 7,195,316 B2 | 3/2007 | Shimasaki et al. | |
| 7,210,740 B2 | 5/2007 | Chintapudi et al. | |

* cited by examiner

*Primary Examiner* — Sarah B McPartlin
(74) *Attorney, Agent, or Firm* — Drinker Biddle & Reath LLP

(57) ABSTRACT

A chair having an adjustable seat pan that can be moved from an angled to a flat position is disclosed. The chair includes a seat frame having a front end and a rear end with a seat back attached to the rear end of the seat frame. A seat articulator that includes a ramp bar that has a first end connected to the seat back and an upper edge with a second end displaced downward from the upper edge is adjacent to the seat frame. The seat pan is pivotally connected to the seat frame and a drop down link is pivotally attached to the seat pan. A cam roller is attached to the drop down link where it is positioned on the upper edge of the ramp bar in contact with the seat pan.

18 Claims, 10 Drawing Sheets

SEAT PAN CAM FOLLOWER WITH DROP DOWN MECHANISM

FIELD OF THE INVENTION

This invention pertains to a vehicle seat in general and, more particularly, to a passenger seat used in an aircraft.

BACKGROUND OF THE INVENTION

Traditional seats were designed so that the seating portion of the seat was at a right angle to the backrest. These seats, however, proved to be uncomfortable to sit in during long trips or flights. In an effort to improve the comfort level of seats, manufactures have tried various designs including increased padding in the seat and backrests as well as installing lumbar cushions in the lower portion of the back rest in an attempt to relieve pressure in the lower back of the seat occupant.

Another way of making seating more comfortable was to incline the seat with respect to the backrest. The inclination of the seat by approximately 2-6° allows the weight of the occupant to be transferred toward the intersection of the seat bottom with the back rest. This reduces the fatigue on the gluteus maximus that results from sitting directly on one's bottom for extended periods of time.

Although the angling of the seat bottom with respect to the back rest provides for greater comfort over an extended period of time, such an arrangement is not always possible or practicable. For example, in an aircraft passenger seat, the seat bottom or pad is angled at between 2-6° for taxi, take-off, and landing (TTOL). The seat bottom could remain at this angle throughout the flight, however, should one attempt to work at a desk or tray table, or eat sitting at this angle they would have to move up to the edge of the seat or lean forward so as to be able to write or avoid dropping food down the front of themselves. This type of seating is not necessarily desirable, particularly for executive-style seating on private or VIP aircraft.

It would be much more practical to work or eat in a chair in which the seat bottom was flat as opposed to being oriented at approximately a 6° angle. For this reason, a seat having a drop down seat pan that could be positioned either flat or angled approximately 6° from the horizontal would be an important improvement in the art.

SUMMARY

The invention is directed to a chair having an adjustable seat pan that can be moved from an angled to a flat position. The chair is comprised of a seat frame having a front end and a rear end with a seat back attached to the rear end of the seat frame. A seat articulator that includes a ramp bar that has a first end connected to the seat back and an upper edge with a second end displaced downward from the upper edge is adjacent to the seat frame. The seat pan is pivotally connected to the seat frame and a drop down link is pivotally attached to the seat pan. A cam roller is attached to the drop down link where it is positioned on the upper edge of the ramp bar in contact with the seat pan.

BRIEF DESCRIPTION OF THE DRAWINGS

The above-noted and other advantages of the invention will be apparent from the description of the invention provided herein with reference to the attached drawings in which.

DETAILED DESCRIPTION OF THE EMBODIMENTS

The following examples further illustrate the invention but, of course, should not be construed as in any way limiting its scope.

Figure 2:
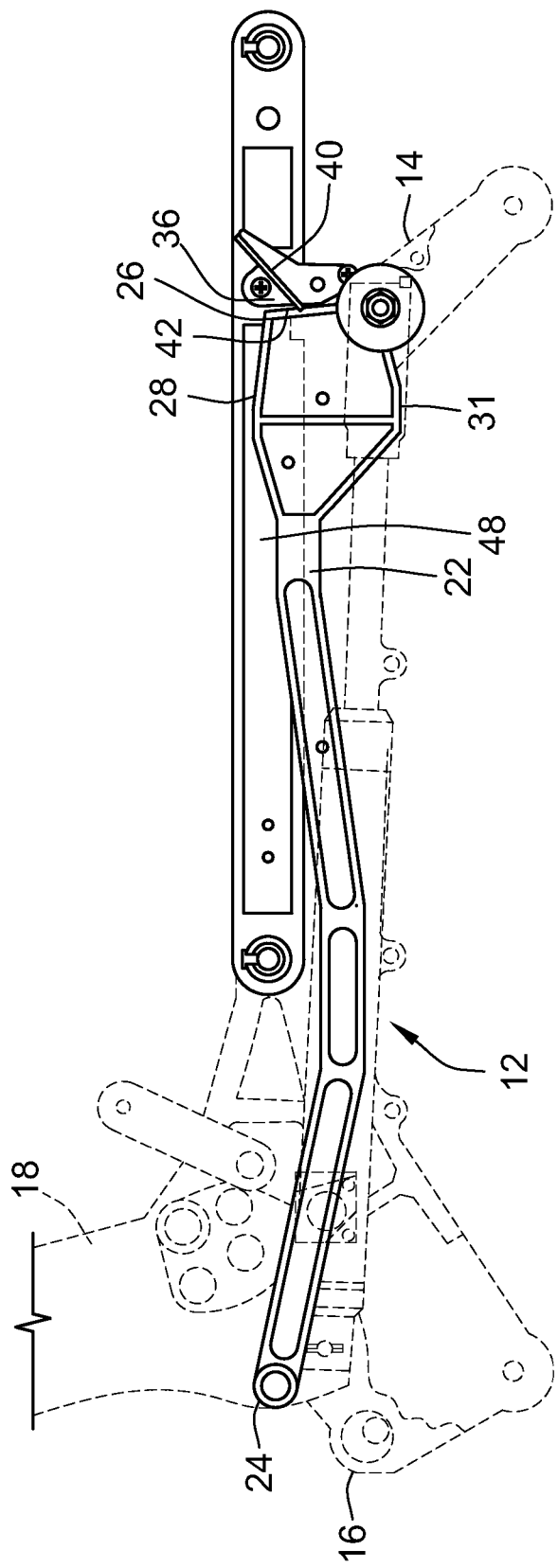
FIG. 2 is a side view of the seat pan and ramp showing the cam roller positioned in the first catch portion of the ramp bar.

Disclosed is a chair 10 that includes a seat frame 12 having a front end 14 and a rear end 16. As shown in FIGS. 1-7, a seat back 18 is attached to the rear end 16 of the seat frame 12 in such a manner that it is movable between a generally upright and a fully reclined position, as shown in FIGS. 1, and 4-7. The chair 10 also includes a seat articulator 20 that has a ramp bar 22 that has a first end 24 connected to the seat back 18 and a second end 26 proximal to the front end 14 of the seat frame 12. The ramp bar 22, as shown in FIGS. 2, 4, and 5, includes an upper edge 28, a first catch portion 30 displaced downward from the upper edge 28, and a lower edge or underside 31 in contact with a cross member 32 located between a first and a second side of a seat frame 12.

Figure 1:
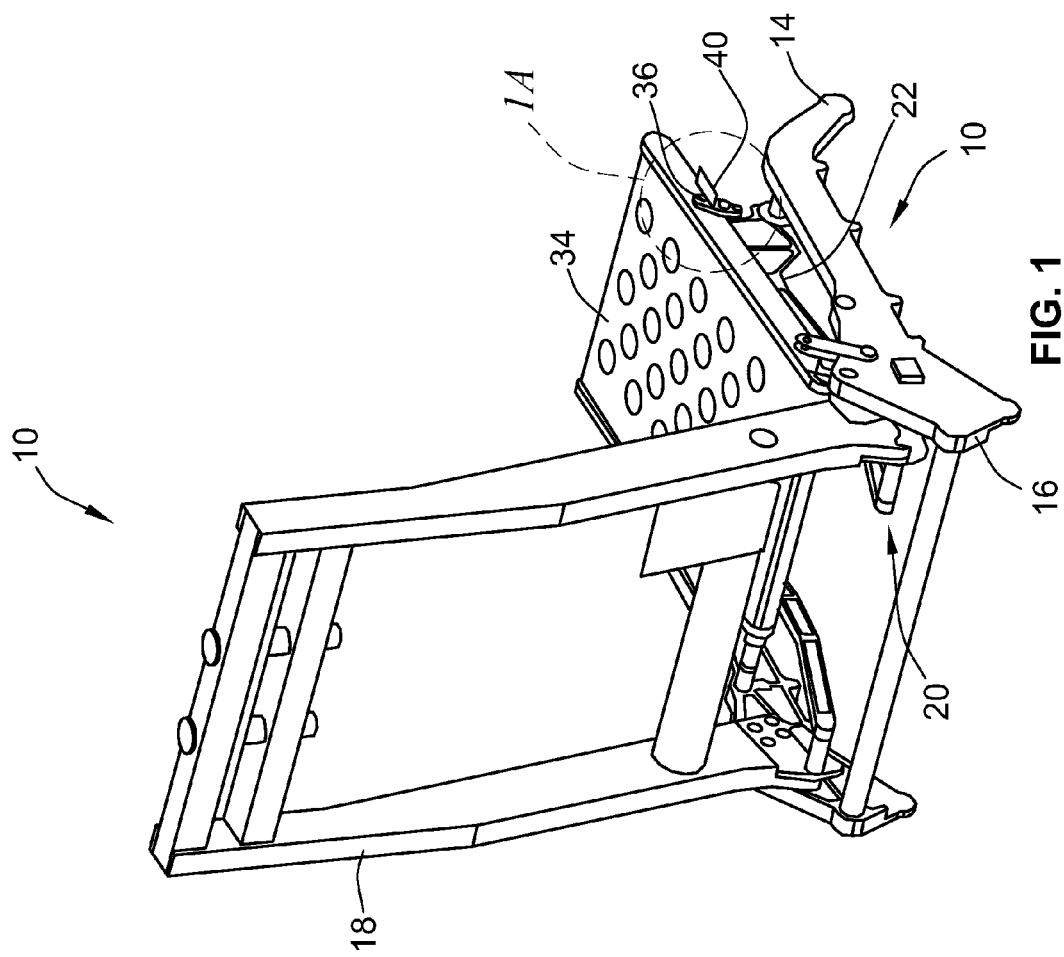
FIG. 1 is a perspective view of a chair having an adjustable seat pan.
Figure 1A:
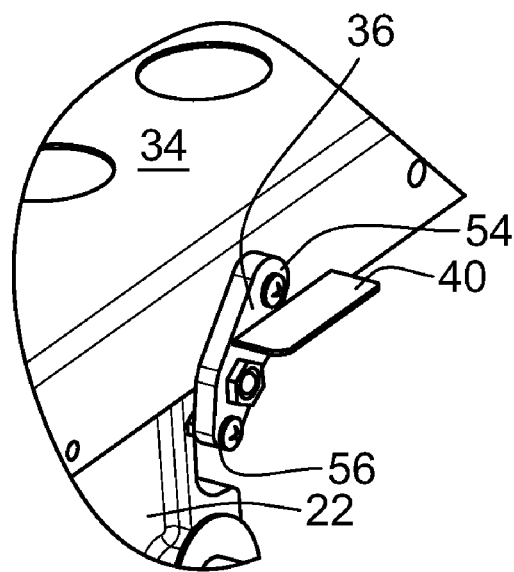
FIG. 1(a) is a perspective view showing the drop-down link and activation lever.

As shown in FIGS. 1, 2, and 4-7, a seat pan 34 is pivotally connected to the seat frame 12 while a drop-down link 36 is pivotally attached to the seat pan 34 and a cam roller 38 is attached to the drop-down link 36. The cam roller 38 is positioned so as to be in contact with the ramp bar 22. An activation lever 40 is connected to the drop-down link 36, as shown in FIG. 1(a).

As shown in FIG. 2, the end of the upper edge 28 of the ramp bar 22 that is distal to the seat back 18 forms a front edge 42. The front edge 42 is located at approximately a 90° angle with respect to the upper edge 28 and terminates in the first catch portion 30 (FIG. 4a). This first catch portion 30 extends forward from the front edge 42 at approximately 90° with respect to the front edge 42, as shown in FIGS. 4, 4(a), 4(b), 5(a), 5(b), 6, 6(a), 7, and 7(a).

When in operation, the seat pan 34 is positioned at approximately a 6° angle with respect to the seat frame 12 for TTOL of an aircraft. When in this position, the seat back 18 is in a generally upright position, as shown in FIGS. 4, and 4(a)-(b), the cam roller 38 is on the upper edge 28 of the ramp bar 22 adjacent the front edge 42. Of course, the angle the seat pan 34 forms with respect to the seat frame 12 can be increased or decreased depending on the size of the drop-down link 36 without departing from the spirit and scope of the invention. In this embodiment, the drop-down link 36 may form an approximately 45° angle with the upper edge 28 of the ramp bar 22.

During flight, most seat occupants will retain the seat pan 34 in the angled position as it provides for greater comfort over long periods of flight. Should the occupant desire the seat pan 34 to be flat so as to allow one to sit more upright in order to work or eat, for example, he would press the activation lever 40, shown in FIGS. 1(a), 2, 5, and 5(b), connected to the drop-down link 36, thereby forcing the cam follower 38 to roll forward along the upper edge 28 and then down along the front edge 42 of the ramp bar 22, until it comes to rest on the first catch portion 30, as shown in FIGS. 5, 5(a), and 5(b). In this position, when the seat back 18 is in a generally upright position, the cam roller 38 is in contact with the first catch portion 30, and the seat pan 34 is aligned at approximately 0° with the seat frame 12. In this position, the drop-down link 36 may form approximately a 90° angle with respect to the seat pan 34. In order to raise the seat, the occupant pulls on the activation lever 40, thereby pulling the cam follower 38 back up the front edge 42 of the ramp bar 22 to the upper edge 28.

Figure 1B:
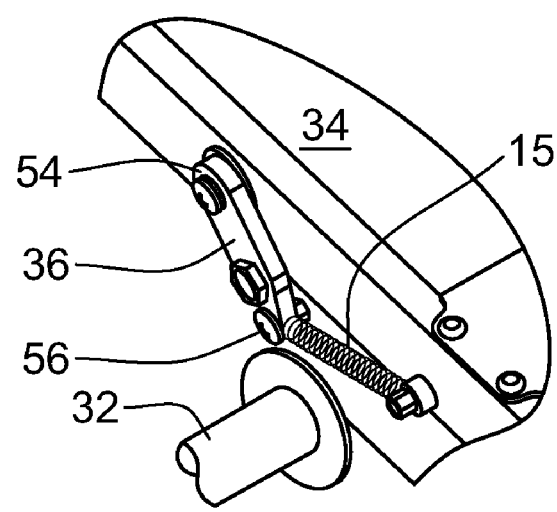
FIG. 1(b) is a perspective view of the drop-down link showing the spring activation mechanism.

As shown in FIG. 1(b), a spring 15 biases the drop down link at approximately a 45° angle with respect to the seat pan.

Figure 6:
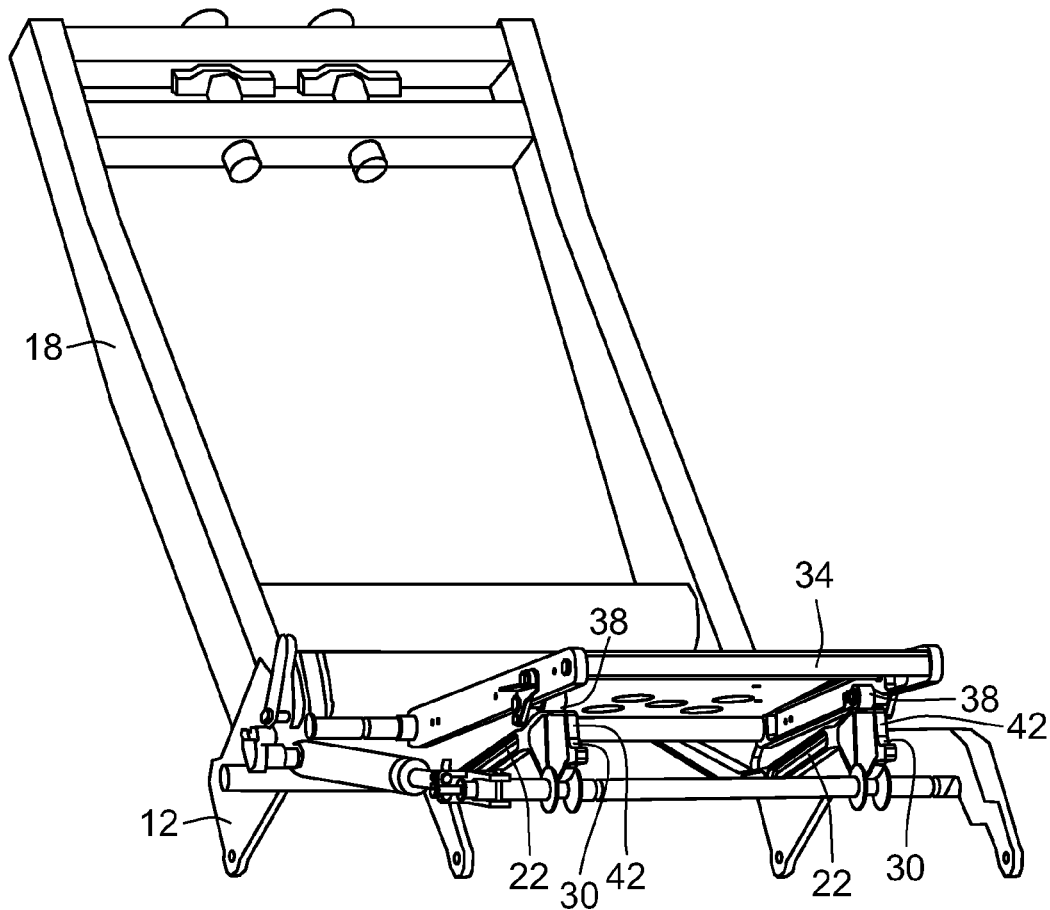
FIG. 6 is a perspective view of the chair with the backrest reclined approximately 45° and the seat pan angled approximately 10° with respect to the seat frame.
Figure 6A:
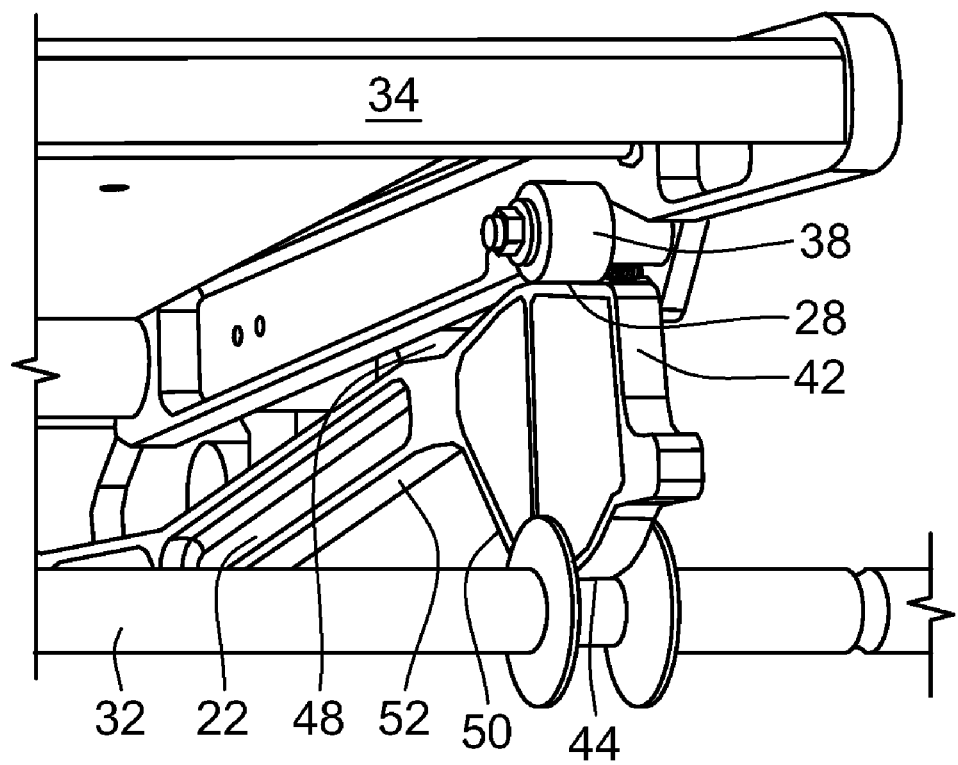
FIG. 6(a) is a perspective view showing an inboard view of the cam roller positioned on the upper edge of the ramp bar.

In yet another position, the occupant may desire to recline the seat back 18. As shown in FIG. 6, when the seat back 18 is inclined at an approximately 45° angle with respect to the seat frame 12, the cam roller 38 is positioned on the upper edge 28 of the ramp bar 22, as shown in FIG. 6(a). As the seat back 18 reclines, the ramp bar 22 extends forward such that a second catch portion 44 formed in the bottom edge 46 of the underside of the ramp bar 22 is in contact with the cross member 32, thereby causing the seat pan 34 to be elevated approximately 10° with respect to the seat frame 12. This is accomplished by the reclining seat back 18 forcing the ramp bar 22 forward across the cross member 32 until the second catch portion 44 engages the cross member 32, as shown in FIG. 6. As the ramp bar 22 moves forward, the front edge 42 of the ramp bar 22 moves away from the cam roller 38, as shown in FIG. 6(a).

Figure 7A:
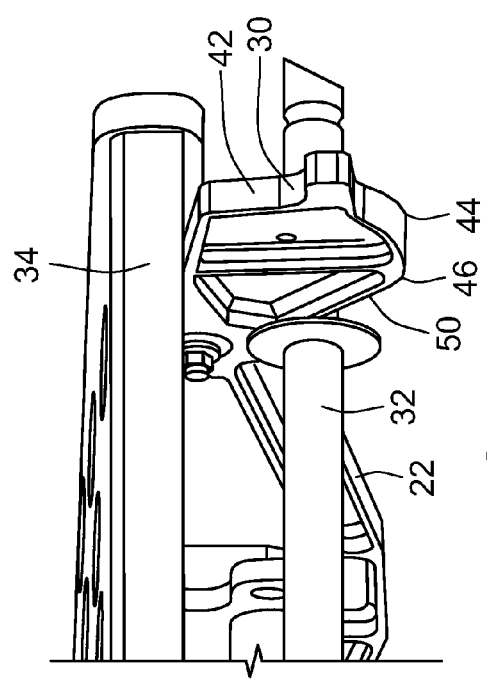
FIG. 7(a) is a perspective view showing an inboard view of the ramp bar with the cam roller positioned in an upper catch position distal to the front edge of the ramp bar.
Figure 7:
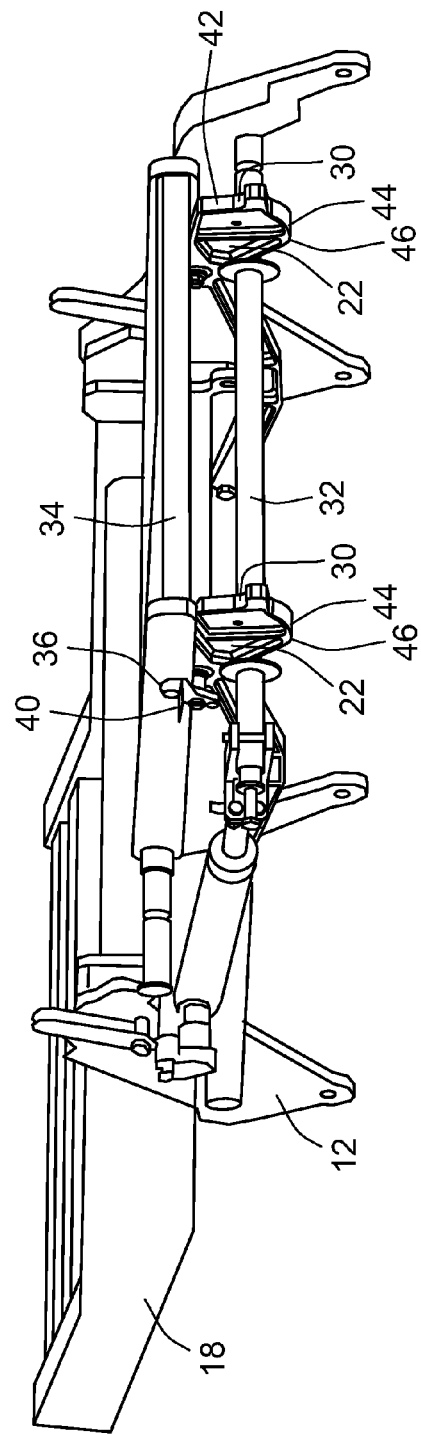
FIG. 7 is a perspective view showing the chair with the seat back in a fully reclined position and the front edge of the ramp bar forward of the cross member.

In still another position, as shown in FIG. 7, the seat back 18 is fully reclined. When the seat back 18 is in this position, as shown in FIGS. 7 and 7(a), the cam roller 38 is positioned in an upper catch portion 48 in the bottom edge 46 of the ramp bar 22 distal to the front edge 42, and the ramp bar 22 extends forward such that the bottom edge 46 of the under side of the ramp bar 22 extends forward of the cross member 32, thereby causing the seat pan 34 to be aligned at approximately 0° with respect to the seat pan 34. This is accomplished by the seat back 18 forcing the second catch portion 44 of the ramp bar 22 over the cross member 32 which then rides up an inclined portion 50 of the underside of the ramp bar 22 until the cross member encounters a horizontal portion 52 of the underside of the ramp bar 22.

As shown in FIGS. 1(a) and (b), the drop-down link 36 includes a first end 54 connected to the seat pan 34, a second end 56 proximal to the ramp bar 22, a cam follower or roller 38 connected to the drop-down link 36, and a actuation 40 is attached to the drop-down link 36.

In an embodiment, the cam follower 38 is connected to an inboard side 58 of the drop-down link 36, and the actuation lever 40 is attached to an outboard side 60 of the drop-down link 36.

In still another embodiment, the ramp bar 22 includes a first catch portion 30, and the second end 56 of the drop-down link 36 is adjacent the first catch portion 30 of the ramp bar 22 when the seat pan 34 is aligned with the seat frame 12, as shown in FIGS. 2, 5, 5(a) and (b). In this embodiment, the second end 56 of the drop-down link 36 is adjacent the upper edge 28 of the ramp bar 22 when the seat pan 34 is angled approximately 2-6° with respect to the seat frame 18.

Figure 3:
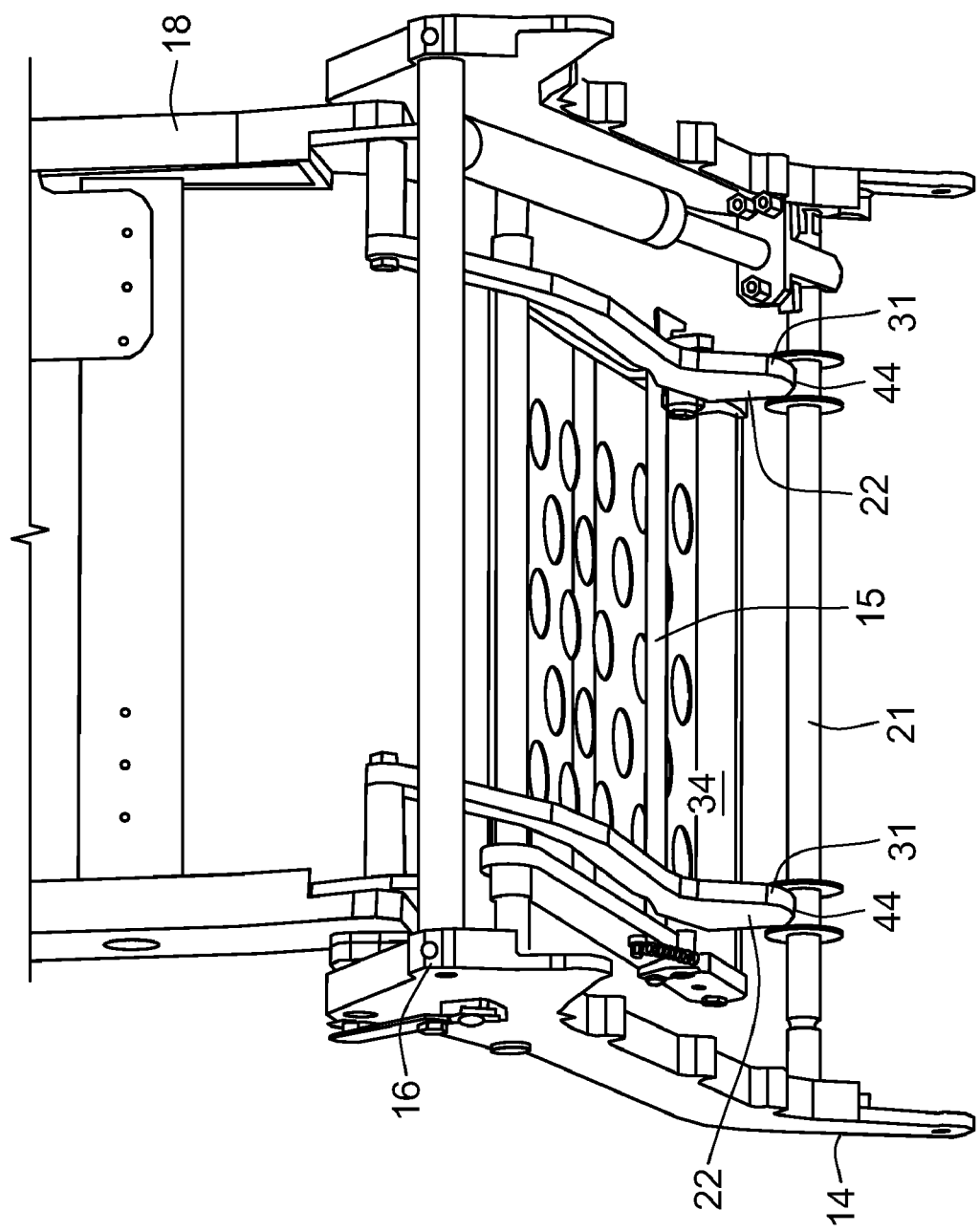
FIG. 3 is an underside perspective view of the seat frame and seat pan.
Figure 4:
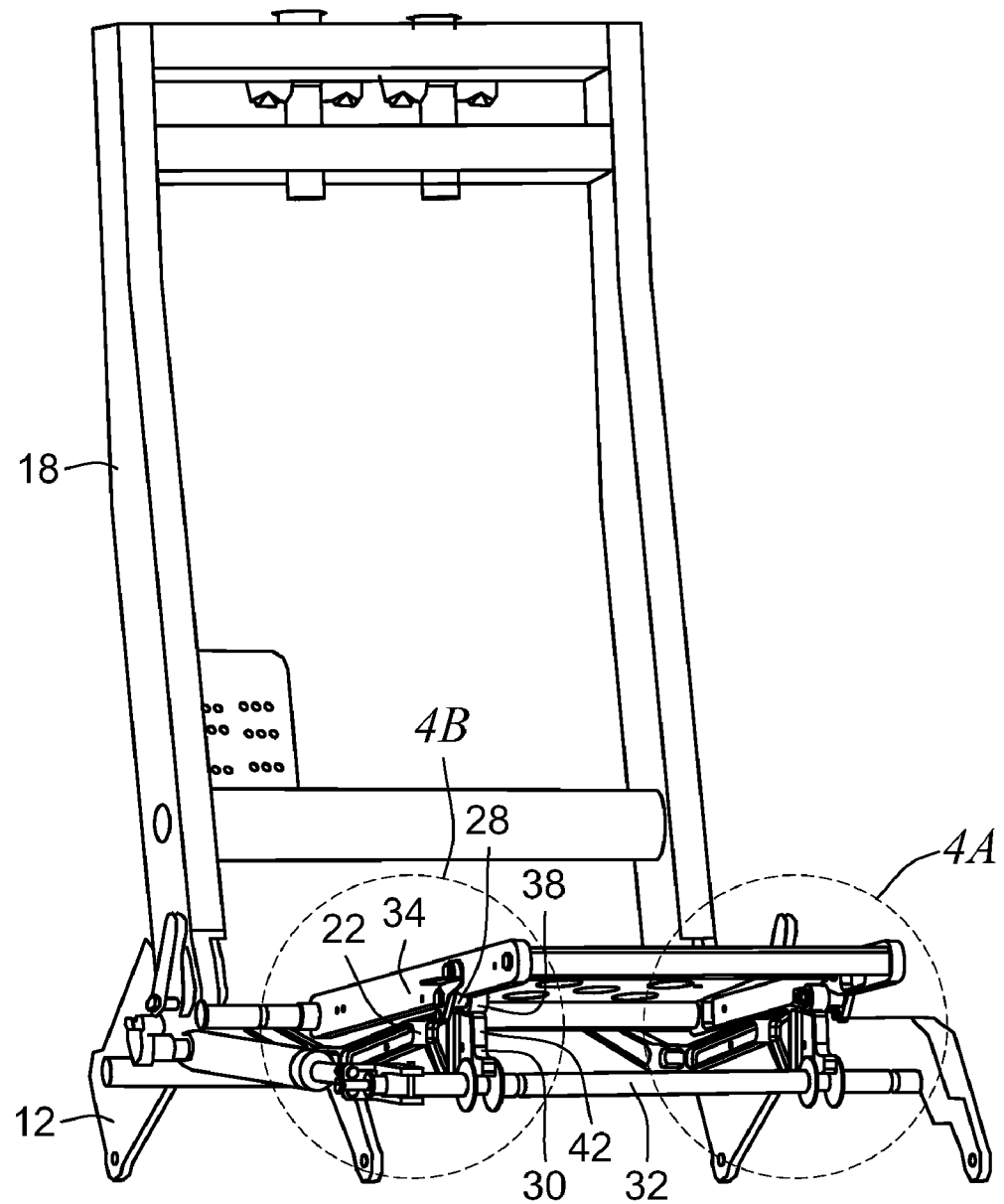
FIG. 4 is a perspective view of the chair showing the seat back in a raised position and the seat pan angled approximately 6° with respect to the seat frame.
Figure 4A:
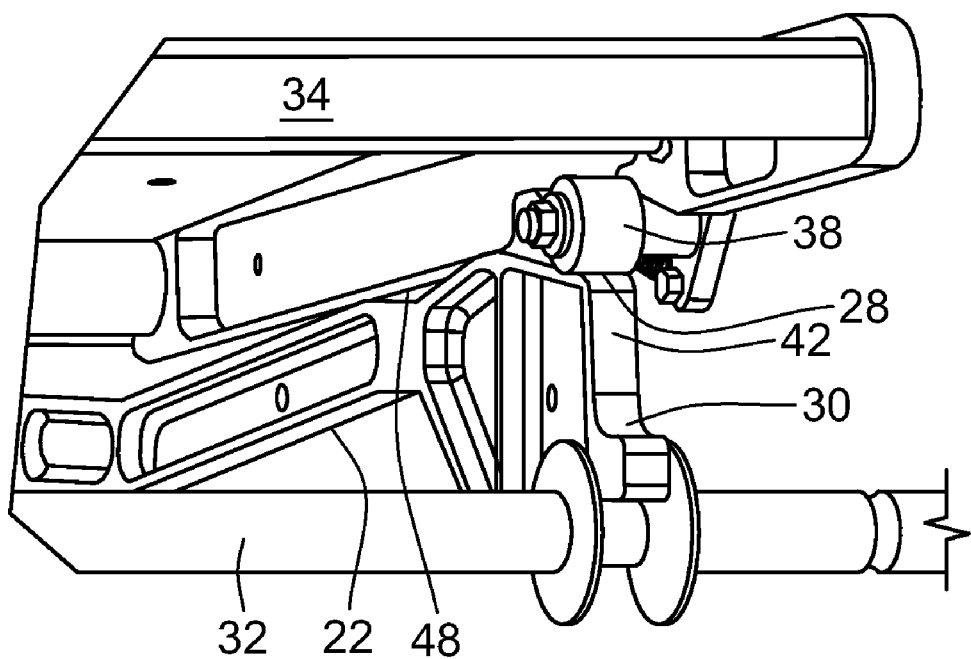
FIG. 4(a) is a perspective view showing an inboard view of the seat pan and ramp bar with the cam roller positioned on the upper edge of the ramp bar when the seat pan is angled approximately 6° with respect to the seat frame.
Figure 4B:
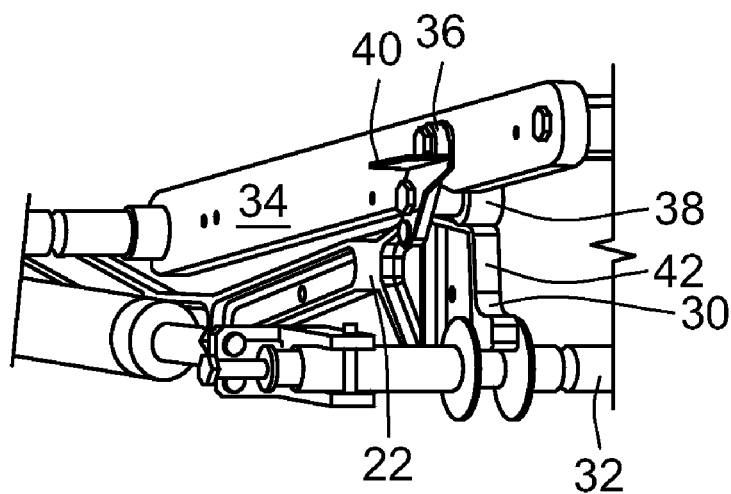
FIG. 4(b) is a perspective view showing an outboard view of the ramp bar and seat pan with the cam roller positioned on the upper edge of the ramp bar when the seat pan is angled approximately 6° with respect to the seat frame.
Figure 5:
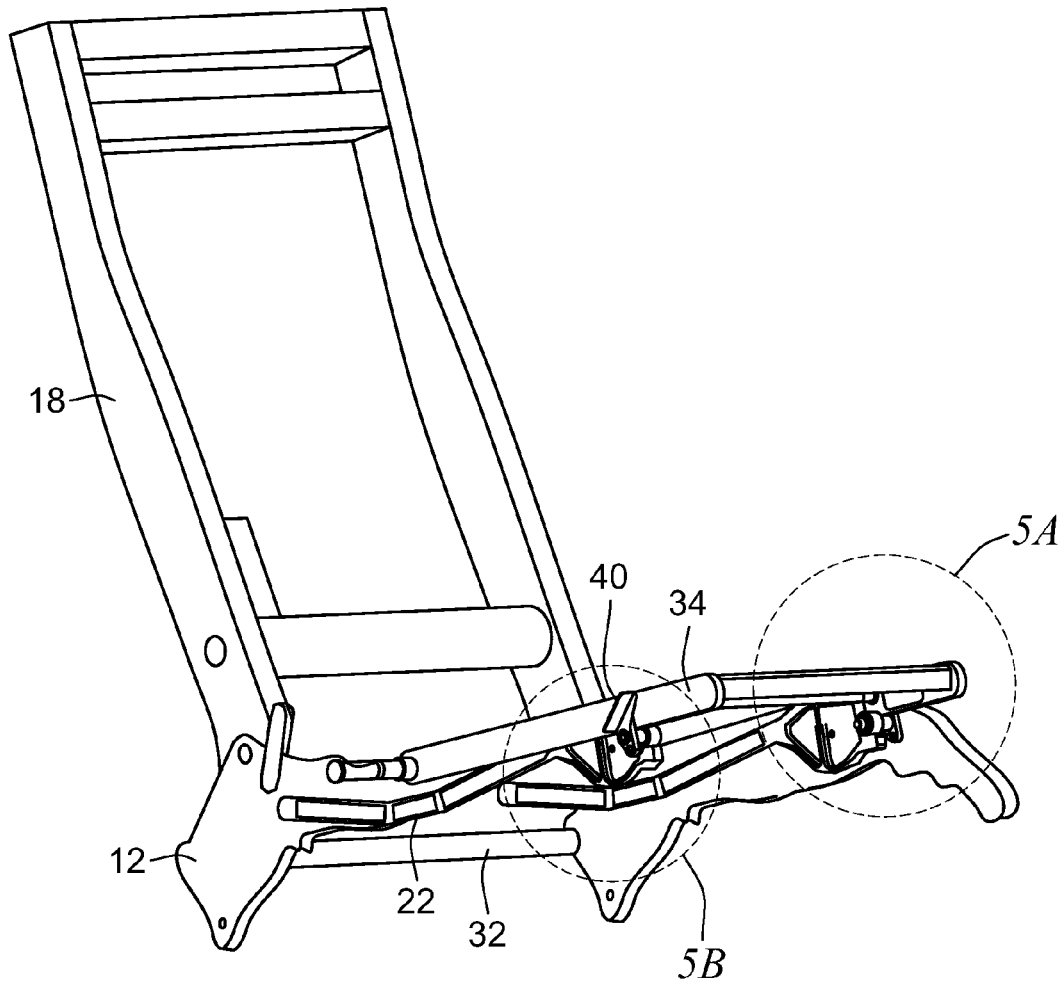
FIG. 5 is a perspective view showing the seat pan in a flat or lowered position with the cam follower positioned in the first catch portion of the ramp bar.
Figure 5A:
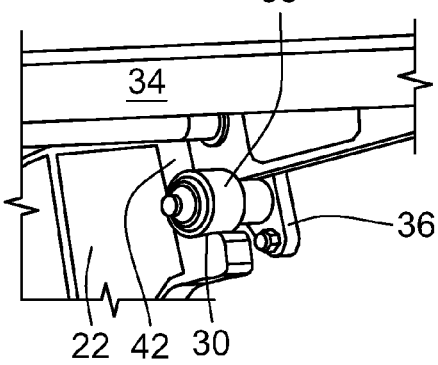
FIG. 5(a) is a perspective view showing an inboard view of the cam roller positioned in the first catch portion of the ramp bar.
Figure 5B:
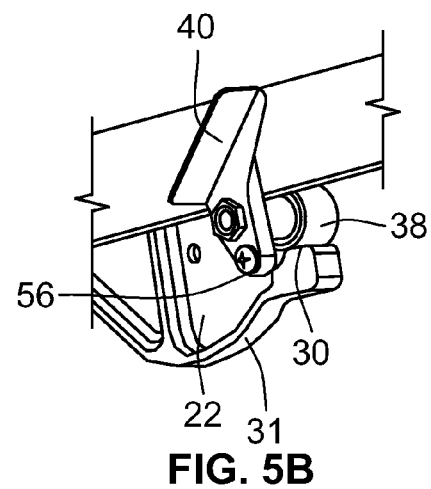
FIG. 5(b) is a perspective view showing an outboard view of the cam roller positioned in the first catch portion of the ramp bar.

While the operation of the ramp bar 22 and drop-down link 36 have been described with respect to one ramp bar and drop-down link, opposing ramp bars 22 and drop-down links 36 are positioned on both side of the seat pan 34, as shown in FIGS. 1-7. As shown in FIG. 3, a cross-tube 15 transmits the rotation of the actuation lever 40 on one drop-down link 36 to a second drop-down link 34 on the opposite side of the seat pan 34.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A chair comprising:
   a seat frame having a front end and a rear end;
   a seat back attached to the rear end of the seat frame, said seat back being movable between a generally upright and a generally reclined position;
   a seat articulator including a ramp bar, the ramp bar having a first end connected to the seat back and a second end proximal to the front end of the seat frame, the ramp bar including an upper edge and a front edge distal to the seat back, said front edge terminating in a first catch portion immovably associated with the ramp bar displaced downward from the upper edge and extending forward from the front edge, and a lower edge in contact with a cross member located between a first and a second side of the seat frame;

a seat pan pivotally connected to the seat frame;

a drop down link pivotally attached to the seat pan; and a cam roller attached to the drop down link, the cam roller positioned in contact with the ramp bar.

2. The chair of claim 1, wherein an activation lever is connected to the drop down link.

3. The chair of claim 1, wherein:

said front edge is located at approximately a 90° angle with respect to the upper edge; and said first catch portion extends forward from the front edge at approximately 90° with respect to the front edge.

4. The chair of claim 1, wherein:

the seat back is in a generally upright position;

the cam roller is on the upper edge of the ramp bar adjacent the front edge; and the seat pan is angled approximately 6° with respect to the seat frame.

5. The chair of claim 4, wherein the drop down link forms approximately 45° angle with the upper edge.

6. The chair of claim 1, wherein:

the seat back is in a generally upright position;

the cam roller is in contact with the first catch portion; and the seat pan is aligned at approximately 0° with the seat frame.

7. The chair of claim 6, wherein the drop down link forms approximately a 90° angle with respect to the seat pan.

8. The chair of claim 1, wherein the drop down link is spring biased at approximately a 45° angle with respect to the seat pan.

9. The chair of claim 1, wherein:

the seat back is inclined approximately 45° with respect to the seat frame;

the cam roller is positioned on the upper edge of the ramp bar; and the ramp bar extends forward such that a second catch portion formed by a bottom edge of the ramp bar is in contact with the cross member, thereby causing the seat pan to be elevated approximately 10° with respect to the seat frame.

10. The chair of claim 1, wherein:

the seat back is fully reclined;

the cam roller is positioned in an upper catch portion distal to the front edge; and the ramp bar extends forward such that the bottom edge of the ramp bar extends forward of the cross member, thereby causing the seat pan to be aligned at approximately 0° with respect to the seat pan.

11. The chair of claim 1, wherein the drop down link includes:

a first end connected to the seat pan;

a second end proximal to the ramp bar;

a cam follower connected to the drop-down link; and a drop-down lever attached to the drop-down link.

12. The chair of claim 11, wherein:

the cam follower is connected to an inboard side of the drop-down link; and the drop-down lever is attached to an outboard side of the drop-down link.

13. The chair of claim 11, wherein the second end of the drop-down link is adjacent the first catch portion of the ramp bar when the seat pan is aligned with the seat frame.

14. The chair of claim 11, wherein the second end of the drop-down link is adjacent the upper edge of the ramp bar when the seat pan is angled approximately 2-6° with respect to the seat frame.

15. The chair of claim 1, wherein a second ramp bar is located on a second side of the seat pan opposite the first ramp bar; a second drop-down link is pivotally attached to the second side of the seat pan; and a cross-tube translates rotation between the first drop-down link and the second drop-down link.

16. The chair of claim 1, wherein the first catch portion is formed as an integral part of the ramp bar.

17. A chair comprising:

a seat frame having a front end and a rear end;

a seat back attached to the rear end of the seat frame, said seat back being movable between a generally upright and a generally reclined position;

a seat articulator including a ramp bar, the ramp bar having a first end connected to the seat back and a second end proximal to the front end of the seat frame, the ramp bar including an upper edge that forms a front edge distal to the seat back, said front edge terminating in a first catch portion displaced downward from the upper edge and extending forward from the front edge, and a lower edge in contact with a cross member located between a first and a second side of the seat frame;

a drop down link pivotally attached to a seat pan;

a cam roller attached to the drop down link, the cam roller positioned in contact with the ramp bar; and the seat pan is pivotally connected to the seat frame and has an angle with respect to the seat frame that decreases when the cam roller is moved from the upper edge to the first catch portion.

18. A chair comprising:

a seat frame having a front end and a rear end;

a seat back attached to the rear end of the seat frame, said seat back being movable between a generally upright and a generally reclined position;

a seat articulator including a ramp bar, the ramp bar having a first end connected to the seat back and a second end proximal to the front end of the seat frame, the ramp bar including an upper edge that forms a front edge distal to the seat back, said front edge terminating in a first catch portion displaced downward from the upper edge and extending forward from the front edge, and a lower edge in contact with a cross member located between a first and a second side of the seat frame;

a seat pan pivotally connected to the seat frame;

a drop down link located closer to the front end than the rear end and is pivotally attached to the seat pan; and a cam roller attached to the drop down link, the cam roller positioned in contact with the ramp bar.

* * * * *